(12) United States Patent
Lysen

(10) Patent No.: US 10,704,952 B2
(45) Date of Patent: Jul. 7, 2020

(54) SYSTEM AND METHOD FOR MEASURING VIBRATION ON A MACHINE

(71) Applicant: PRÜFTECHNIK Dieter Busch AG, Ismaning (DE)

(72) Inventor: Heinrich Lysen, Garching (DE)

(73) Assignee: PRÜFTECHNIK DIETER BUSCH AG, Ismaning (DE)

( * ) Notice: Subject to any disclaimer, the term of this patent is extended or adjusted under 35 U.S.C. 154(b) by 216 days.

(21) Appl. No.: 15/970,386

(22) Filed: May 3, 2018

(65) Prior Publication Data

US 2018/0321080 A1 Nov. 8, 2018

(30) Foreign Application Priority Data

May 3, 2017 (DE) .................. 10 2017 109 460

(51) Int. Cl.
*B23Q 3/154* (2006.01)
*B23Q 9/02* (2006.01)
*G01H 15/00* (2006.01)
*G01H 11/08* (2006.01)

(52) U.S. Cl.
CPC ............ *G01H 15/00* (2013.01); *B23Q 3/1546* (2013.01); *B23Q 9/02* (2013.01); *G01H 11/08* (2013.01)

(58) Field of Classification Search
CPC ........ B23Q 3/1546; B23Q 9/02; G01H 15/00; G01H 11/08
USPC .......................................................... 73/649
See application file for complete search history.

(56) References Cited

U.S. PATENT DOCUMENTS

| 5,642,089 | A | * | 6/1997 | Lysen | .................. | B23Q 3/1546 335/285 |
| 6,663,575 | B2 | * | 12/2003 | Leysieffer | .............. | A61B 5/121 600/25 |
| 6,998,999 | B2 | * | 2/2006 | Fripp | ....................... | B06B 1/06 166/250.01 |

(Continued)

FOREIGN PATENT DOCUMENTS

CN 102944581 A * 2/2013
DE 10106060 A1 9/2001

(Continued)

OTHER PUBLICATIONS

Min, Jiyoung, Park, Seunghee et al.: Development of a low-cost multifunctional wireless impedance sensor node; Smart Structures and Systems, 2010, vol. 6, No. 5, p. 689-709.

(Continued)

*Primary Examiner* — Jacques M Saint Surin
(74) *Attorney, Agent, or Firm* — Millman IP Inc.

(57) ABSTRACT

The invention relates to a system for measuring vibration on a machine, with a carrier (14) for placing onto a measuring point (12) of the machine, a sensor (16) arranged on the carrier for detecting vibrations, an arrangement (16, 22, 28, 30) for detecting the electromechanical impedance of the sensor and also a monitoring device (22, 24, 26) for monitoring the current coupling of the carrier at the measuring point by means of evaluating the detected electromechanical impedance. The current coupling is in this case determined from the difference between the currently detected electromechanical impedance and the electromechanical impedance detected for a prescribed optimum coupling of the carrier to the measuring point.

15 Claims, 1 Drawing Sheet

(56) References Cited

U.S. PATENT DOCUMENTS

| | | | |
|---|---|---|---|
| 8,809,065 B2 * | 8/2014 | Mutharasan | G01N 27/12 436/149 |
| 2003/0024298 A1 * | 2/2003 | Baber | G01D 3/08 73/1.82 |
| 2004/0194532 A1 | 10/2004 | Lally et al. | |
| 2005/0228597 A1 | 10/2005 | Giurgiutiu et al. | |
| 2012/0296582 A1 * | 11/2012 | Hedin | G01H 1/003 702/56 |
| 2014/0142872 A1 * | 5/2014 | Hedin | G01N 29/14 702/56 |
| 2015/0226603 A1 * | 8/2015 | Hedin | G01H 1/003 702/39 |
| 2016/0341629 A1 | 11/2016 | Schaefer | |
| 2017/0205293 A1 | 7/2017 | Lysen et al. | |

FOREIGN PATENT DOCUMENTS

| | | |
|---|---|---|
| DE | 102014217706 A1 | 3/2016 |
| EP | 2209110 A1 | 7/2010 |

OTHER PUBLICATIONS

Park, Seunghee, Shin, Hyun-Ho, Yun, Chung-Bang: Wireless impedance sensor nodes for functions of structural damage identification and sensor self-diagnosis; Smart Materials and Structures, 2009, vol. 18, No. 5, p. 001-011.

* cited by examiner

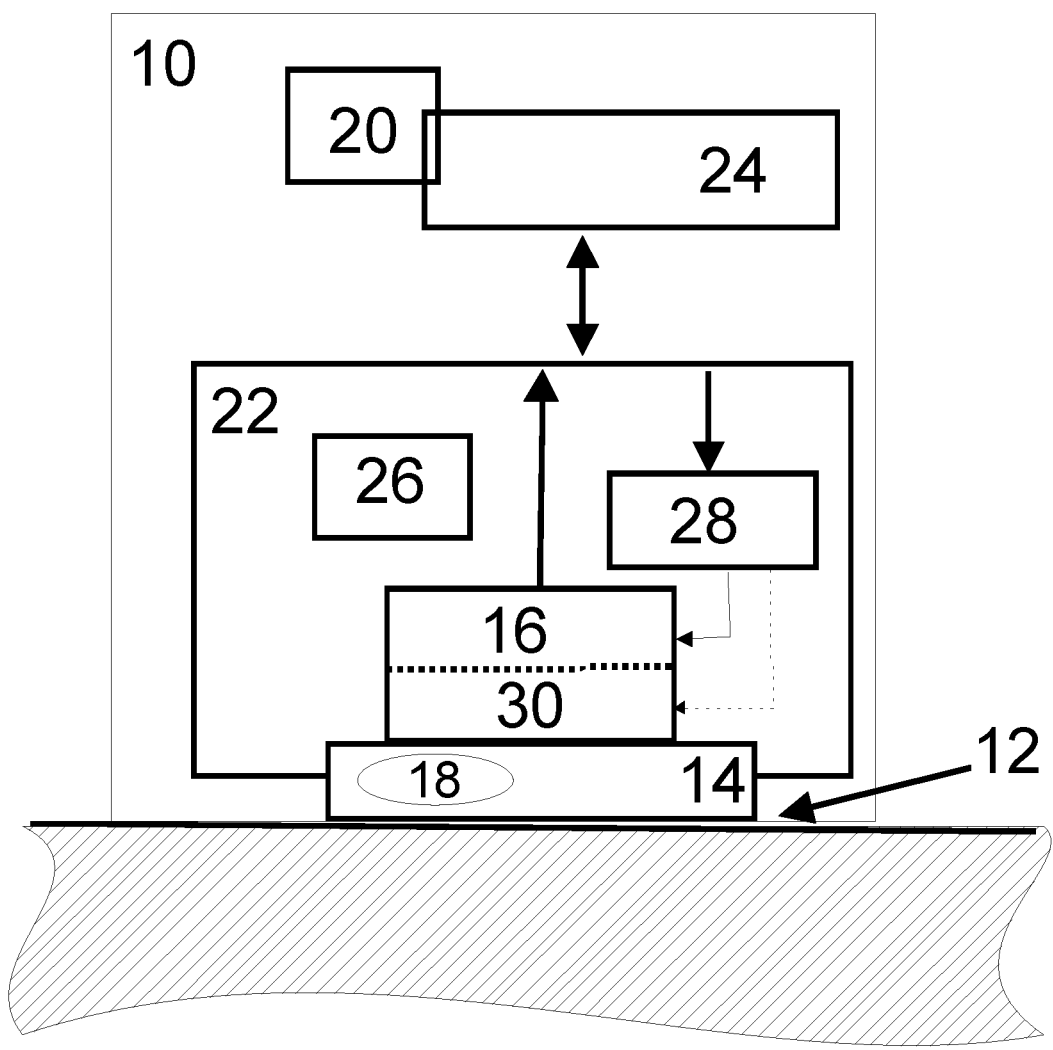

SYSTEM AND METHOD FOR MEASURING VIBRATION ON A MACHINE

The invention relates to a system and a method for measuring vibration on a machine.

Vibration measurements are an essential aspect when monitoring the state of machines, a vibration measuring device typically being placed with a carrier, which carriers a vibration sensor, onto a surface of the machine. For a reliable vibration measurement, it is essential that there is a good mechanical coupling here between the carrier of the vibration sensor and the machine surface. A relatively insecure coupling may exist for example if the vibration measuring device is pressed manually onto the machine or is held on the machine by means of a magnetic holding device with the aid of magnetic forces. This applies in particular if the machine surface is rough, uneven, coated and/or contaminated with swarf, dust or lubricating grease; in the case of a magnetic holding device, an unknown or variable magnetic permeability of the machine in the region of the measuring point may also be problematic.

EP 2 209 110 A1 describes a vibration sensor which operates inductively and has an exciter coil, by means of which vibrations can also be generated via the sensor.

Vibration sensors that are held on the machine surface by means of a magnetic holding device are known for example from U.S. Pat. No. 5,642,089, DE 10 2014 217 706 A1 or DE 101 06 060 A1.

The object of the present invention is to provide a system and a method for measuring vibration on a machine comprising a carrier for placing onto the measuring point of the machine and a vibration sensor arranged on the carrier, it being intended for particularly reliable vibration measurement to be made possible.

This object is achieved according to the invention by a system according to claim 1 and a method according to claim 14.

In the case of the solution according to the invention, it is advantageous that detecting the complex electromechanical impedance of the vibration sensor and determining the current coupling of the carrier to the measuring point of the machine from the difference between the currently detected electromechanical impedance and the electromechanical impedance detected for a prescribed optimum coupling of the carrier to the measuring point results in a monitoring of the current coupling that allows the quality of the vibration measurement to be assessed and erroneous vibration measurements that are caused by inadequate coupling to be avoided.

Preferred refinements of the invention are provided by the subclaims.

Refinements of the invention are explained in more detail below by way of example on the basis of the accompanying drawing, the single FIGURE schematically showing an example of a vibration measuring system according to the invention.

The single FIGURE shows a vibration measuring device 10, which is to be placed onto a machine surface 12 and forms a system and has a carrier 14, on which an electromechanical vibration sensor 16 (typically with a piezoelectric transducer) is arranged. The carrier 14 may have a magnetic holding device 18 for holding the carrier 14 on the measuring point or the machine surface 12 by means of magnetic forces. Furthermore, the vibration measuring device 10 has an input device 20 for inputting data and commands, a data processing device 22, which can be used both for processing the data supplied by the vibration sensor 16 and as a control unit for the measuring device 10, an output device 24 for outputting measurement results and also a data memory 26.

Furthermore, the measuring device 10 is designed such that it can detect the electromechanical impedance of the sensor 16 and can determine the current coupling of the carrier 14 to the machine surface 12 from the difference between the currently detected electromechanical impedance of the sensor 16 and the electromechanical impedance detected for a prescribed optimum coupling of the carrier 14 to the machine surface 12. In this case, the data memory 26 can be used for storing the electromechanical impedance detected for a prescribed optimum coupling of the carrier 14 to the machine surface 12. In the determination of the electromechanical impedance for the optimum coupling of the carrier 14 to the machine surface 12, measuring conditions that are defined as precisely as possible are created, by the carrier 14 being placed onto a defined surface that is as smooth and clean as possible, the surface of the carrier 14 also being correspondingly cleaned in advance. In this case, the pressing force or holding force of the carrier 14 on the machine surface should also be detected or checked as accurately as possible, in order to obtain a reference value that is as reliable as possible for the electromechanical impedance of the sensor 16 when there is optimum coupling.

"Electromechanical impedance" means here that changes in the mechanical coupling of the sensor 16 to the machine are reflected in changes in the electrical impedance of the sensor 16, i.e. the electrical impedance of the mechanically coupled sensor 16 is determined in a state of induced vibration as a function of the frequency in order to obtain information with respect to the mechanical coupling. In fact, therefore, the electrical impedance of the sensor/transducer 16 is measured.

According to a first exemplary embodiment, the electromechanical impedance can be detected by using a driver 28 of the data processing/control device 22 to allow the vibration sensor 16 also to be used as an exciter for the impedance measurement, while the electromechanical transducer (typically a piezoelectric transducer) of the sensor 16 should have a highest possible electromechanical coupling factor.

According to an alternative embodiment, the exciter may be provided as an element 30 that is separate from the sensor 16. The response of the system to the excitation is in both cases detected by the vibration sensor 16.

Since the electromechanical impedance measured in the vibration measuring device 10 depends on the coupling of the carrier 14 to the machine surface 12, the current coupling can be estimated or determined, at least in comparison with the previously determined optimum coupling, by detecting the current electromechanical impedance. When detecting the electromechanical impedance, it can be assumed that the mass of the machine is much greater than the mass of the vibration sensor 16.

The output device 24 can be used not only for outputting results of vibration measurements but also for outputting information concerning the current coupling, so that, if the coupling is currently poor, the user can for example re-place the measuring device 10 or dispense entirely with a vibration measurement or discard the result of a vibration measurement if the coupling is poor. In this case, the current coupling may be output as a scalar quality indicator, for example with a value between 0 and 1, by means of the output device 24. Alternatively or in addition, a warning signal may be output if the determined current coupling is below a fixed threshold. For example, the determination of the current coupling can also be used to establish whether or not the measuring device 10 is at present placed on a machine or measuring point.

In addition or as an alternative to outputting by means of the output device 24, the determined current coupling may be stored in the data memory 26. In particular, in this case the determined current coupling can be stored together with the result of the corresponding vibration measurement. Furthermore, the current coupling can also be used to correct the results of a corresponding vibration measurement on the basis of the determined corresponding current coupling; for example, the measured vibration amplitude can be increased by correction if a relatively poor coupling is established or the determined frequency response of the current coupling can be taken into account to correct the measured vibration amplitude with regard to the coupling. It is also generally possible to form a model of the coupling or vibration transmission with parameters that have values which are determined empirically with the aid of the determination of the electromechanical impedance and are then used in the correction of the measured vibrations.

The invention claimed is:

1. A system for measuring vibration on a machine, with a carrier (14) for placing onto a measuring point (12) of the machine, and a sensor (16) arranged on the carrier for detecting vibrations, having an arrangement (16, 22, 28, 30) for detecting the electromechanical impedance of the sensor and also a monitoring device (22, 24, 26) for monitoring the current coupling of the carrier at the measuring point by means of evaluating the detected electromechanical impedance, the current coupling being determined from the difference between the currently detected electromechanical impedance and the electromechanical impedance detected for a prescribed optimum coupling of the carrier to the measuring point.

2. A system according to claim 1, wherein the system (10) has a memory device (26) for storing the electromechanical impedance detected for a prescribed optimum coupling of the carrier (14) to the measuring point (12).

3. A system according to claim 1, wherein the system (10) has an output device (24), in order to output results of the monitoring device (22, 24, 26) to a user.

4. A system according to claim 3, wherein the monitoring device (22, 24, 26) is designed to output the current coupling as a scalar quality indicator by means of the output device (24).

5. A system according to claim 4, wherein the monitoring device (22, 24, 26) is designed to output the current coupling as a quality indicator with a value between 0 and 1 by means of the output device (24).

6. A system according to claim 3, wherein the output device (24) is designed to output a warning signal if the current coupling determined by the monitoring device (22, 24, 26) is below a fixed threshold.

7. A system according to claim 1, wherein the system (10) is designed to store the current coupling determined by the monitoring device (22, 24, 26).

8. A system according to claim 7, wherein the system (10) is designed to store the current coupling determined by the monitoring device (22, 24, 26) together with the result of the corresponding vibration measurement.

9. A system according to claim 1, wherein the monitoring device (22, 24, 26) is designed to correct the results of the vibration measurement on the basis of the corresponding current coupling determined by the monitoring device.

10. A system according to claim 1, wherein the arrangement (16, 22, 28) for detecting the electromechanical impedance of the sensor has a driver (28), in order to use the sensor (16) as an exciter.

11. A system according to claim 1, wherein the arrangement (16, 22, 28, 30) for detecting the electromechanical impedance of the sensor has an exciter (30) that is separate from the sensor (16).

12. A system according to claim 1, wherein the device (10) has a magnetic holding device (18) for holding the carrier (14) on the measuring point (12) by means of magnetic force.

13. A system according to claim 1, wherein the monitoring device (22, 24, 26) is designed to detect from the currently detected impedance whether or not the carrier (14) is currently placed on a measuring point (12).

14. A system according to claim 1, wherein the vibration sensor (16) is a piezo sensor.

15. A system for measuring vibration on a machine, wherein:
a vibration sensor is placed with a carrier (14) onto a measuring point (12) of the machine;
the electromechanical impedance of the sensor is detected; and
the current coupling of the carrier at the measuring point is monitored by means of evaluating the detected electromechanical impedance, the current coupling being determined from the difference between the currently detected electromechanical impedance and the electromechanical impedance detected for a prescribed optimum coupling of the carrier to the measuring point.

* * * * *